United States Patent [19]

Dei

[11] Patent Number: 4,695,849
[45] Date of Patent: Sep. 22, 1987

[54] RECORDING APPARATUS

[75] Inventor: Katsuhito Dei, Tokyo, Japan

[73] Assignee: Canon Kabushiki Kaisha, Tokyo, Japan

[21] Appl. No.: 831,571

[22] Filed: Feb. 21, 1986

[30] Foreign Application Priority Data

Feb. 28, 1985 [JP] Japan .................................. 60-37435
Feb. 28, 1985 [JP] Japan .................................. 60-37436

[51] Int. Cl.$^4$ ........................ G01D 15/10; H04N 1/21; G06F 3/12; B41J 5/30
[52] U.S. Cl. ................................ 346/76 L; 346/108; 358/296; 364/900; 400/3
[58] Field of Search ............. 346/76 L, 108; 358/296; 364/900; 400/3

[56] References Cited

U.S. PATENT DOCUMENTS 4,462,701 7/1984 Czyszczewski et al. .......... 400/3 X
4,590,585 5/1986 Cummings et al. ................ 364/900

Primary Examiner—E. A. Goldberg
Assistant Examiner—Gerald E. Preston
Attorney, Agent, or Firm—Fitzpatrick, Cella, Harper & Scinto

[57] ABSTRACT

There is described a printer with improved synchronization, particularly in case a printer unit is separate from a control unit, by releasing clock signals from the control unit to the printer unit.

17 Claims, 9 Drawing Figures

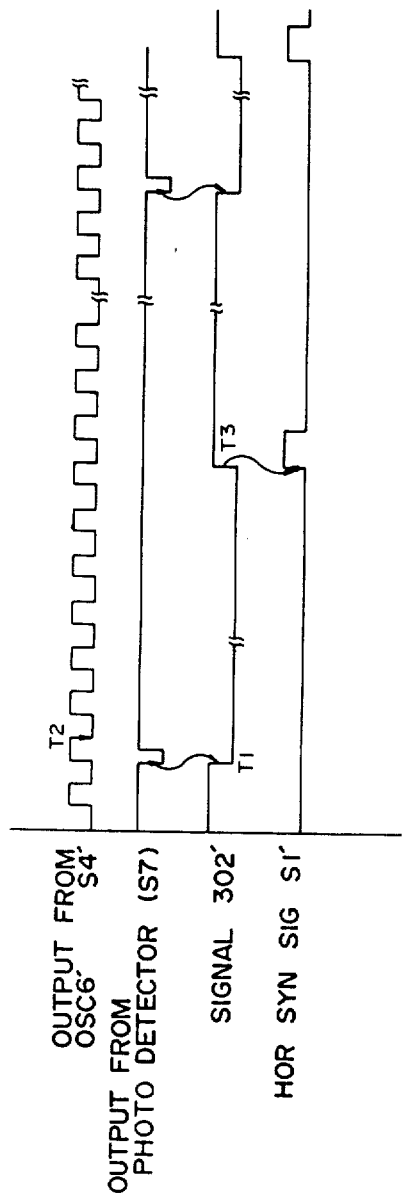

RECORDING APPARATUS

BACKGROUND OF THE INVENTION

1. Field of the Invention

The present invention relates to a recording apparatus for image recording such as a laser beam printer.

2. Related Background Art

In a conventional apparatus for image formation on a photosensitive drum by light beam scanning, for example with a rotary polygonal mirror, such as a laser beam printer, a horizontal synchronization signal is generated from a detection signal indicating that the scanning light beam has reached a scan starting end of the photosensitive drum. For example, in a printer in which a light beam scans a photosensitive drum from left to right, a photodetector is provided close to the left-hand end of the drum, and a horizontal synchronization signal is generated by delaying a detection signal, obtained from the photodetector when the light beam passes, by a determined perior in such a manner that the synchronization signal coincides with the arrival of the light beam at the left-hand end of a recording sheet. Such method is satisfactory if the recording sheet, for receiving the image from the drum after the development of a latent image, is always aligned with to a left-end position regardless of the width of sheet, but the determined period of delay has to be altered if the recording sheet is supplied in such a manner that the center thereof is aligned with to the central axis of a scanning system, or the center of the photosensitive drum, for example in order to utilize better optical characteristics of the central portion of the scanning system. Such alteration can be achieved by counting pixel clock signals corresponding to the pixels to be recorded or other clock signals having a multiple frequency, from the moment the light beam passes the photodetector, and generating the horizontal synchronization signal at a suitable count which is variable according to the size of the recording sheet.

In a conventional printer in which a printer unit is separate from a control unit, pixel clock signals are generated in the printer unit and are sent, together with the horizontal synchronization signal, to the control unit, which sends image signals to the printer unit in synchronization with the pixel clock signals, from the reception of the horizontal synchronization signal. In such structure, if the cable between the printer unit and the control unit is long, the image signals received by the printer unit show a considerable phase delay with respect to the pixel clock signals generated in the printer and often cannot be synchronized therewith, thus giving rise to a distortion in image or a loss of data. Also in the above-explained conventional printer, if the frequency of the pixel clock signals is changed for modifying the image density or for enlarging or reducing the recorded image, the above-mentioned count for generating the horizontal synchronization signal must also to be modified.

SUMMARY OF THE INVENTION

An object of the present invention is to eliminate the above-mentioned drawbacks of conventional printers.

Another object of the present invention is to provide an improved recording apparatus.

Still another object of the present invention is to provide a recording apparatus capable of achieving exact transfer of image data or record data.

Still another object of the present invention is to provide a recording apparatus capable of preventing loss of record data.

Still another object of the present invention is to provide a recording apparatus capable of stable image recording.

Still another object of the present invention is to provide a recording apparatus capable of satisfactory image recording.

Still another object of the present invention is to provide a recording apparatus allowing easy adjustment or control even in case of a modification in the recording density or of an enlargement or reduction of image size.

The foregoing and still other objects of the present invention will become fully apparent from the following description to be taken in conjunction with the attached drawings, and from the appended claims.

BRIEF DESCRIPTION OF THE DRAWINGS

FIG. 9 is a timing chart showing the timing of horizontal synchronization signal.

DETAILED DESCRIPTION OF THE PREFERRED EMBODIMENTS

Now, the present invention will be explained in detail by embodiments thereof shown in the attached drawings.

Figure 1:
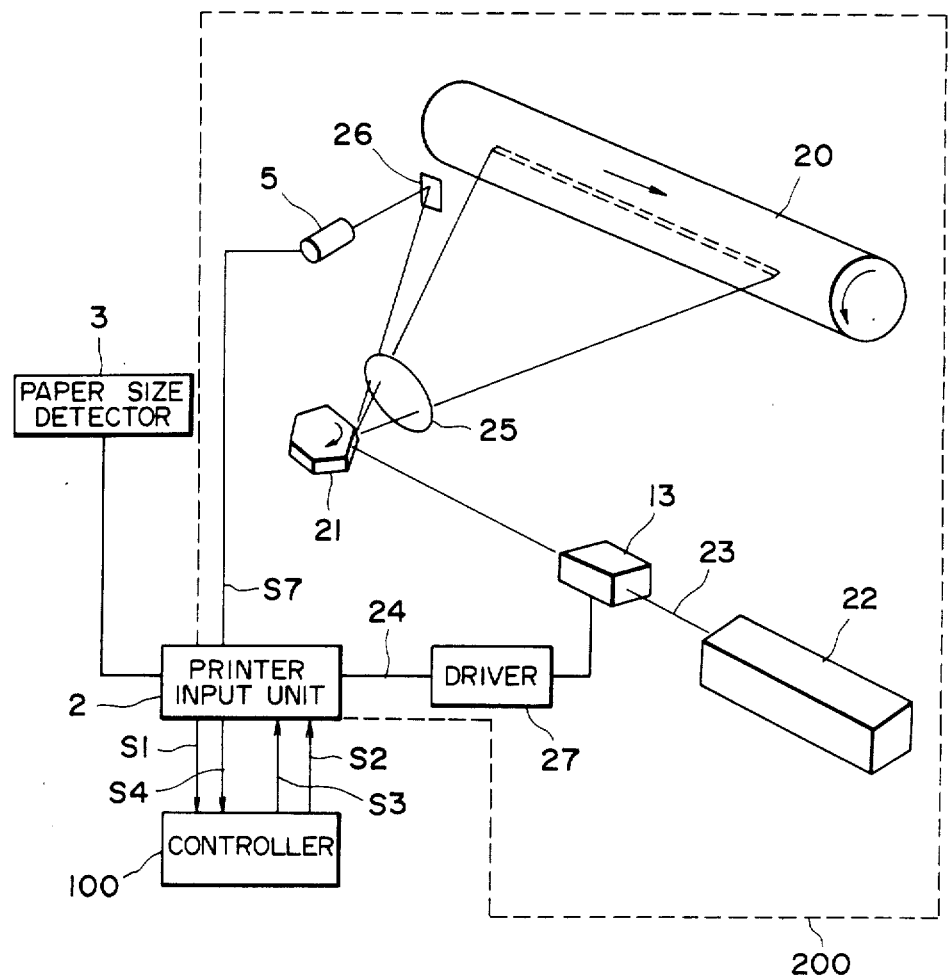
FIG. 1 is a schematic view showing the entire structure of a recording apparatus constituting an embodiment of the present invention.

FIG. 1 schematically shows the entire structure of a recording apparatus constituting an embodiment of the present invention, wherein shown are a control unit 100 for controlling the entire apparatus; a printer unit 200 for recording an image with a laser beam; a sheet size detector 3 for detecting the size of a sheet on which the image is to be recorded; an input unit 2 of the printer unit; a horizontal synchronization signal S1; pixel clock signals S3, S4; an image signal S2 supplied from a latch 11 in the control unit 100, to be explained later. These components will be explained later in more detail, in relation to FIGS. 2 to 4.

In the printer unit 200, shown in FIG. 1, an image signal 24 from a latch 12, provided as will be explained later in the printer input unit 2, is supplied through a driver 27 to an acousto-optical modulating element (light or optical modulator) 13 for modulating a laser beam 23 emitted from a laser unit 22, and the modulated laser beam scans, by means of a rotary polygonal mirror 21, a photosensitive drum 20 in a direction indicated by the arrow, while being focused thereon by a lens 25. Upon reaching the left-hand end of the photosensitive drum 20, the laser beam 23 is reflected by a mirror 26 and detected by a photodetector (or optical detector) 5, of which detection signal (BD) S7 is supplied to the input unit 2.

Figure 2:
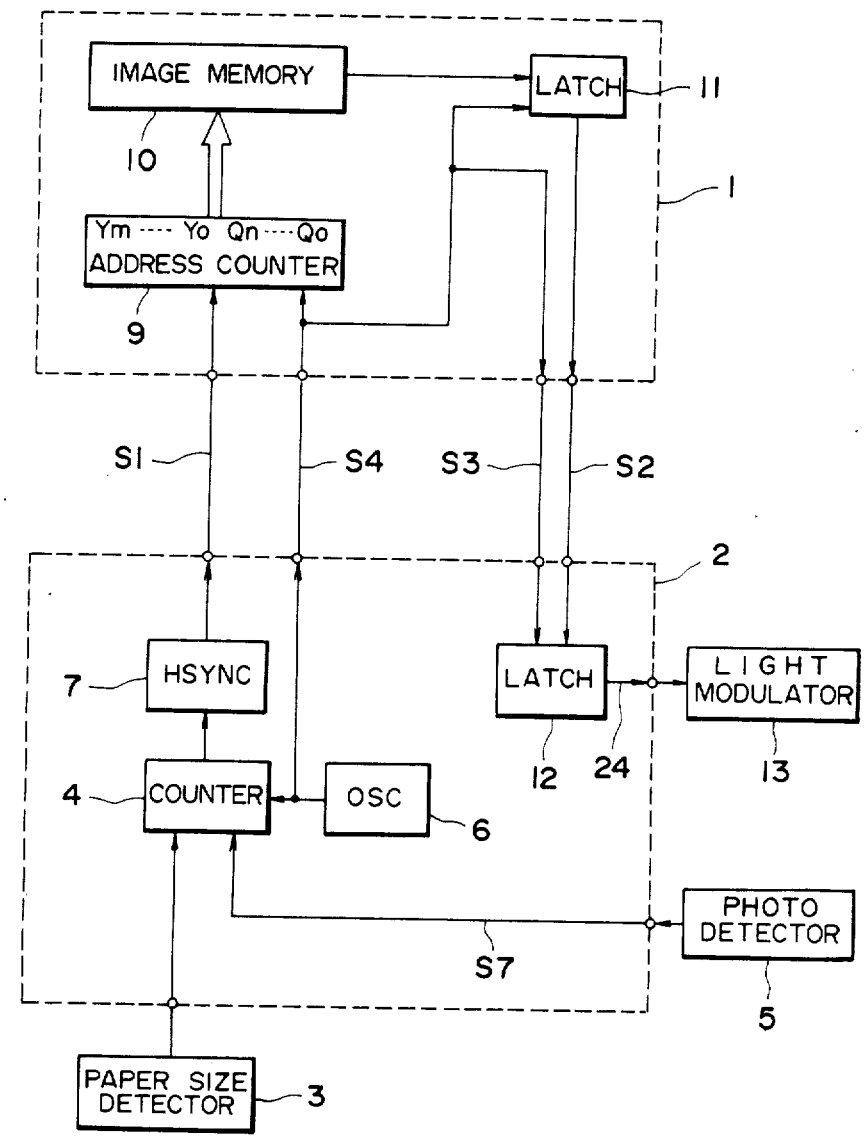
FIG. 2 is a block diagram showing the relation between a printer input unit and a control unit.

FIG. 2 shows the relation between the printer input unit 2 and the control unit 100, wherein the same components as those in FIG. 1 are represented by the same reference numbers or symbols. There are also shown a part 1 of the control unit 100; a counter 4 for obtaining a count corresponding to the sheet size; an internal oscillator 6 of the printer unit for generating clock signals which are counted by the counter 4 for supplying an output signal to a horizontal synchronization signal generator 7; an address counter 9; an image memory 10 composed, for example, of a random access memory (RAM) for storing image signals which are read in synchronization with pixel clock signals S4 supplied from the address counter 9 and the pixel clock oscillator 6; and data latches 11, 12.

Figure 3:
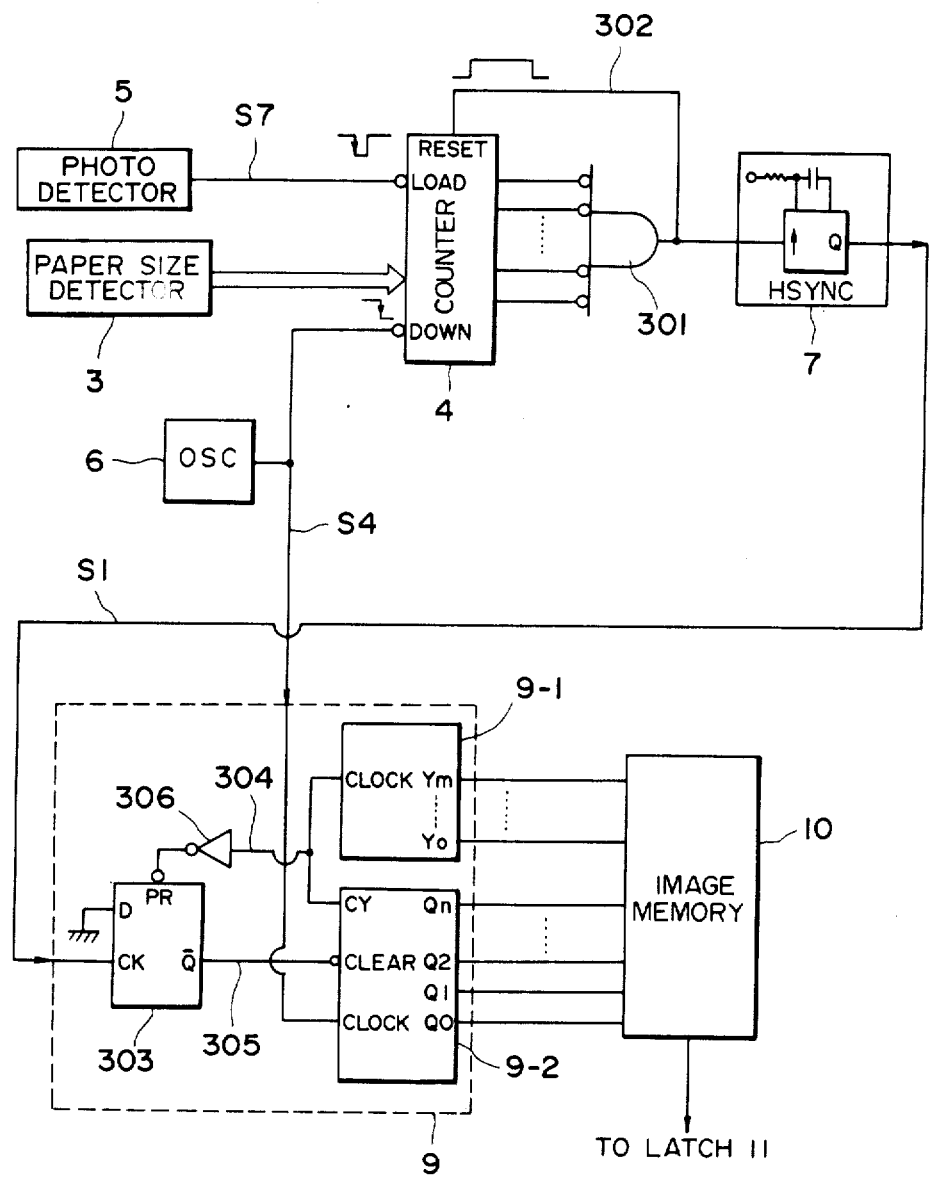
FIG. 3 is a block diagram showing the relation of a horizontal synchronization signal generator, an address counter and an image memory.
Figure 4:
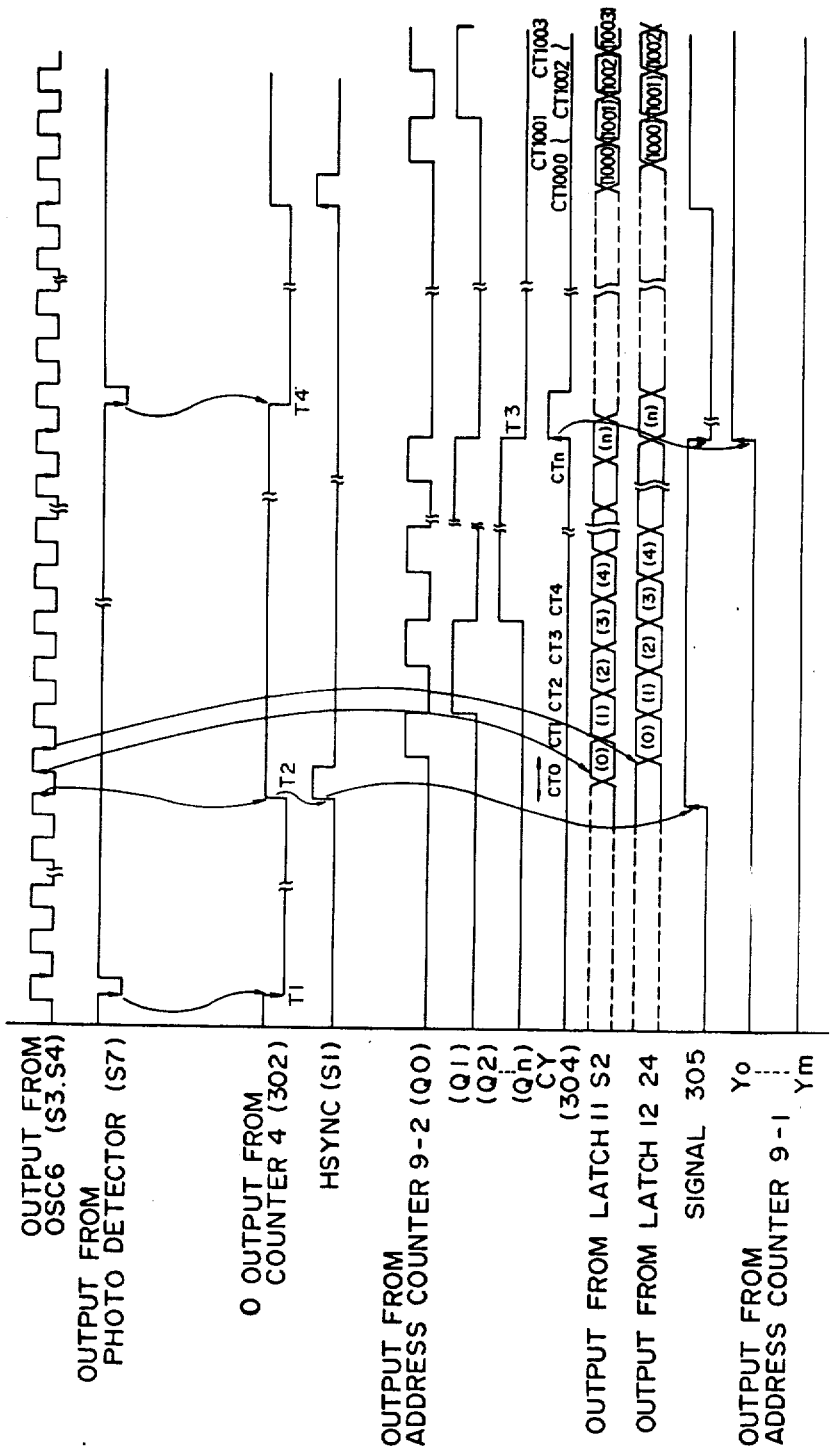
FIG. 4 is a timing chart showing various signals of the circuit shown in FIG. 3.

FIG. 3 shows, in more detail, the relation of the oscillator 6, counter 4, horizontal synchronization signal generator 7, address counter 9 and image memory 10. FIG. 4 is a corresponding timing chart.

In a state where the sheet size detector 3 supplies a currently selected sheet size to the counter 4, when the photodetector 5 detects the laser beam 23, the detection signal S7 is supplied as a load pulse to the counter 4 whereby a number corresponding to the sheet size is preset in said counter 4. In response, a zero-detecting NOR gate 301 releases a low-level output signal 302 (timing T1 in FIG. 4), whereby the counter 4 is released from the reset state and starts a count-down operation at the end of the clock signal S4. After a counting operation corresponding to the sheet size, the output signal 302 of the zero-detecting circuit 301 is again shifted to a high level (timing T2 in FIG. 4) and is supplied to the horizontal synchronization signal generator 7 to generate a horizontal synchronization signal S1 of a determined pulse duration. In this embodiment, there is employed a simple one-shot circuit triggered by the start of an input signal.

On the other hand, in the control unit 100, image signals are stored in the image memory 10 by an unrepresented process and can be read by address signals released from the address counter 9. The address counter is composed of a flip-flop 303, a counter 9-2 for release addresses of a line, and a counter 9-1 for releasing scanning line addresses. In response to the horizontal synchronization signal S1, the $\bar{Q}$ output 305 of the flip-flop 303 is shifted to the high level state (timing T2 in FIG. 4) whereby the counter 9-2 starts a counting operation from zero, thus counting the ends of the pixel clock signals S4 and designating the address of the image memory 10 in cooperation with the counter 9-1. On the other hand, said counter 9-1 performs a stepwise increment in response to each carry signal 304 released from the counter 9-2 (timing T3 in FIG. 4) and releases output signals Y0 - Ym indicating the addresses of the scanning lines.

CT0 - CTn in FIG. 4 indicate the output of the address counter 9, wherein CT0, CT1, . . . , CTn respectively indicate the timings of reading the addresses 0, 1, . . . , n of the image memory 10. The latch 11 is activated at the start of the pixel clock signal S4 to release an output signal S2 as shown in FIG. 4. The signal S2 is supplied to the latch 12 of the printer input unit 2, which is activated at the end of the pixel clock signal S4 in consideration of a delay in timing. FIG. 4 also shows the timing of the signal 24 from said latch 12.

The counter 9-2, which corresponds to the number of data in a line, releases a carry signal 304 (timing T3 in FIG. 4) after beam scanning of a line. The carry signal 304 is supplied, through an inverter 306, to the preset terminal of the flip-flop 303 to shift the output $\bar{Q}$ thereof to the low level state (timing T3 in FIG. 4), whereby the counter 9-2 is cleared and remains zero until the horizontal synchronization signal S1 is entered again. The counter 9-1 performs a stepwise increment by the carry signal 304 to release the addresses of a next scanning line through the lines Y0 - Ym. For example, if a line contains 4096 pixels at maximum, the counter 9-2 releases outputs Q0-Q11 assuming values from 0 to FFF in hexadecimal number (0–4095 in decimal number), while the outputs Y0-Ym of the counter 9-1 represent fourth and upper digits in hexadecimal number, or 13th and upper bits of the address of the image memory 10.

After the scanning of a line, when the beam is detected again by the photodetector 5 at the start of scanning of a succeeding line, data corresponding to the sheet size, obtained from the sheet size detector 3 are loaded in the counter 4 (timing T4 in FIG. 4), and a procedure similar to the foregoing is executed. This procedure is different from the foregoing in that the output of the address counter 9 starts, for example, from an address 1000, in hexadecimal number, and the content of the image memory 10 is released from the address 1000, such as CT1000, CT1001, . . . as shown in FIG. 4, since the output Y0 of the counter 9-1 is in a state "1".

In the foregoing description, the counter 4 need not be composed of a down-counter but may be composed of an up-counter or a combination of an up-counter and a comparator. Also, the image memory 10 and the address counter 9 in the control unit 1 are shown simply for the explanation of the interface, and can be composed of any other component capable of releasing digital pixel signals in synchronization with horizontal synchronization signals and pixel clock signals, such as a television camera or a CCD sensor. Also, in the foregoing explanation it is assumed that the latch 11 performs latching operation at the start of the pixel clock signals S3, S4 while the latch 12 performs latching operation at the end of said pixel clock signals, but both latches 11, 12 may perform the latching operation at the start or end of the pixel clock signals S3, S4.

In the following, there will be explained a second embodiment of the present invention, wherein components equivalent to those in the first embodiment will be represented by the same reference characters.

Figure 5:
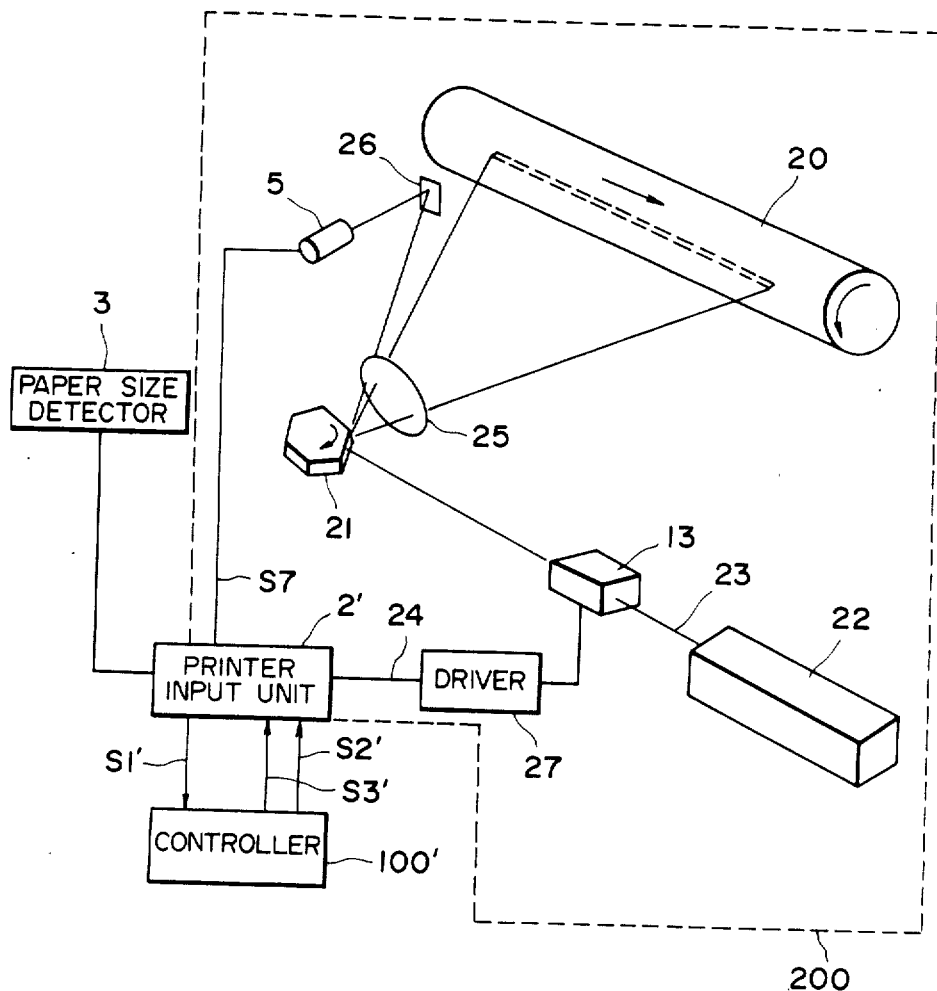
FIG. 5 is a schematic view showing the entire structure of a recording apparatus constituting a second embodiment of the present invention.

FIG. 5 schematically illustrates the entire structure of a recording apparatus constituting a second embodiment of the present invention, wherein shown are a control unit 100' for controlling the entire apparatus; a printer unit 200' for image recording with a laser beam; a sheet size detector 3 for detecting the size of a recording sheet employed; an input unit 2' of said printer unit; a horizontal synchronization signal S1'; a pixel clock signal S3'; and an image signal S2' supplied from a latch 11', to be explained later, of the control unit 100'; which will be explained in more detail in relation to FIGS. 6 to 9.

In the printer unit 200' shown in FIG. 5, an image signal 24' from a latch 12' provided, as will be explained later, in the printer input unit 2' is supplied through a driver 27 to an acousto-optical modulating element (light modulator) 13 for modulating a laser beam 23 emitted from a laser unit 22, and the modulated laser beam scans, by means of a rotary polygonal mirror 21, a photosensitive drum 20 in a direction indicated by the arrow, while being focused thereon by a lens 25. Upon reaching the left-hand end of the photosensitive drum 20, the laser beam 23 is reflected by a mirror 26 and detected by a photodetector 5, of which detection signal (BD) S7 is supplied to the input unit 2'.

Figure 6:
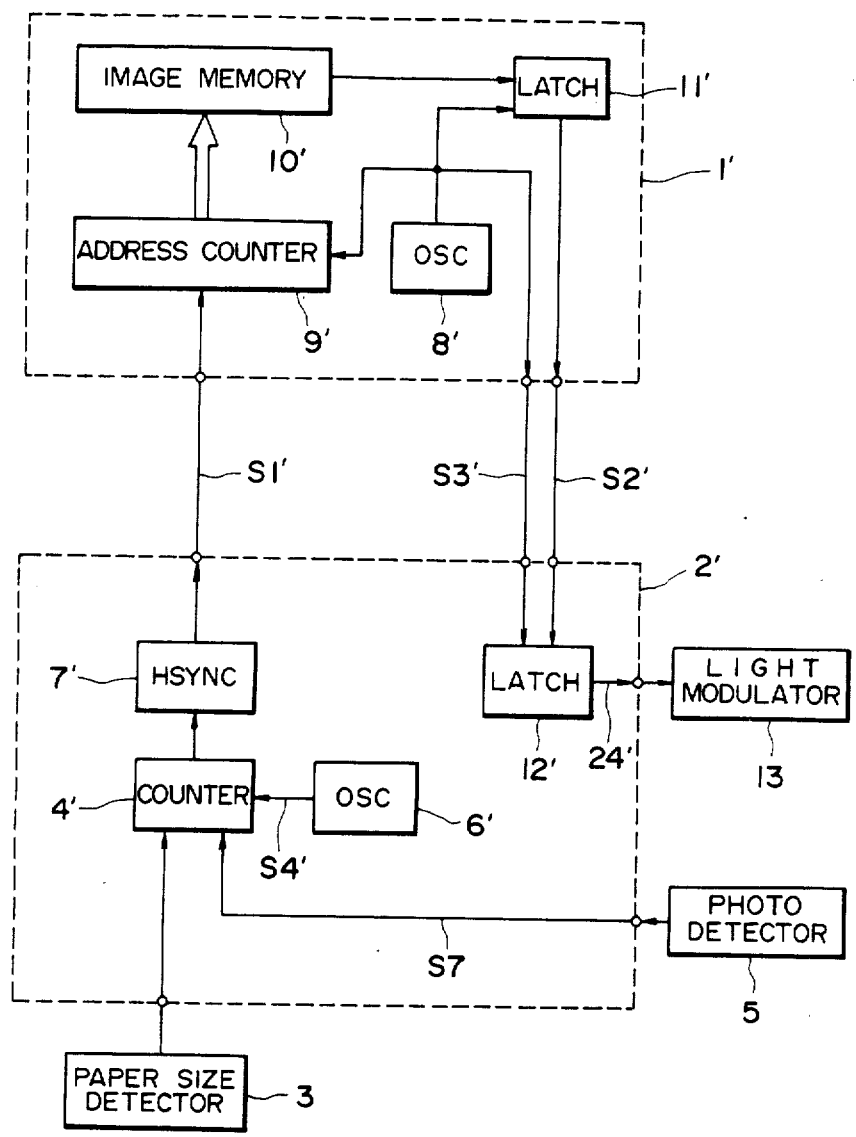
FIG. 6 is a block diagram showing the relation between a printer input unit and a control unit in the second embodiment.

FIG. 6 shows the relation between the printer input unit 2' and the control unit 100', wherein same components as those in FIG. 1 are represented by same numbers or symbols. There are also shown a part 1' of the control unit 100'; a counter 4' for obtaining a count corresponding to the sheet size; an internal oscillator 6' of the printer unit for generating clock signals which are counted by the counter 4' for supplying an output signal to a horizontal synchronization signal generator 7'; a pixel clock oscillator 8' of the control unit; an address counter 9'; an image memory 10 composed, for example, of a random access memory (RAM) for storing image signals which are read in synchronization with pixel clock signals S3' supplied from the pixel clock oscillator 8' and the address counter 9'; and data latches 11', 12'.

Figure 7:
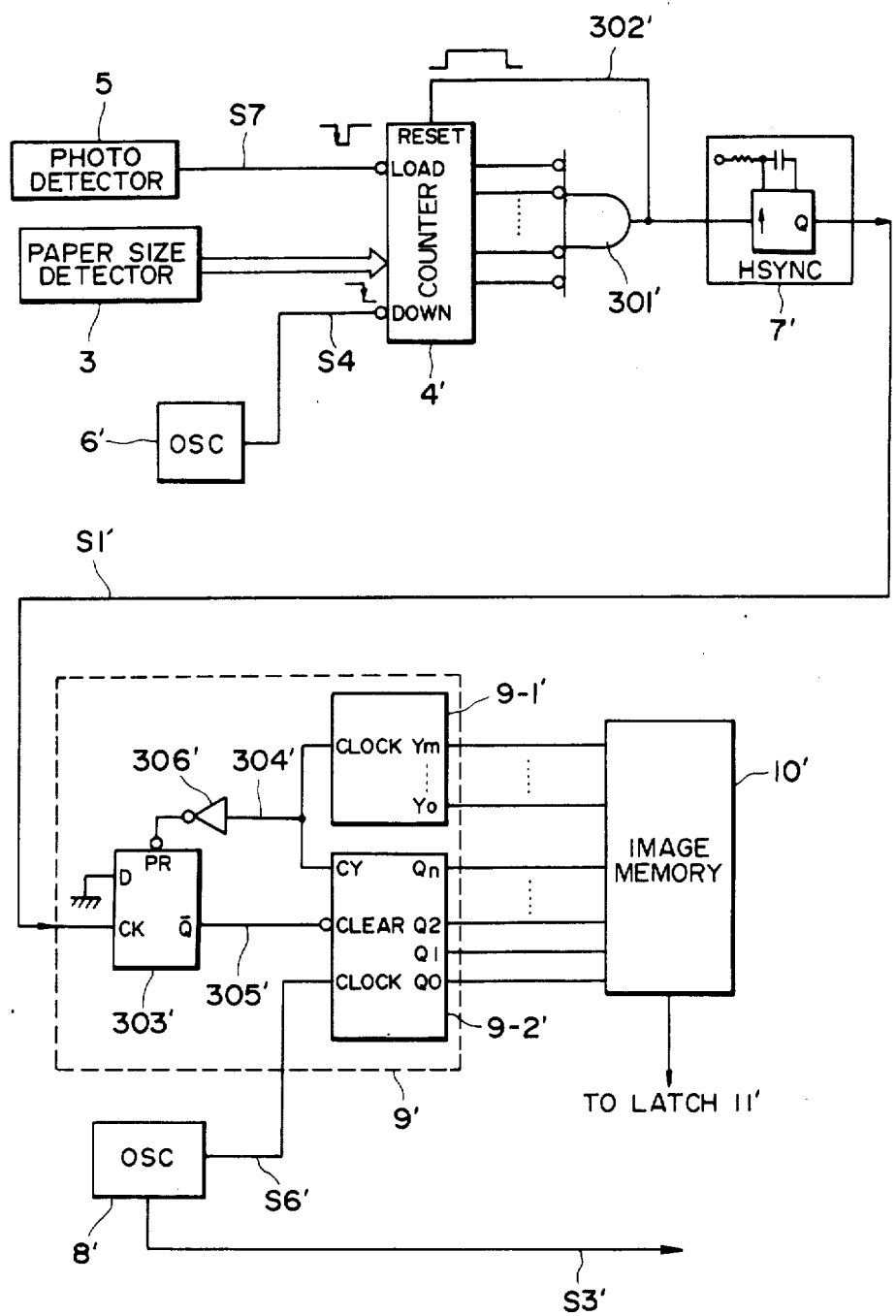
FIG. 7 is a block diagram showing the relation of a horizontal synchronization signal generator, an address counter and an image memory in the second embodiment.
Figure 8:
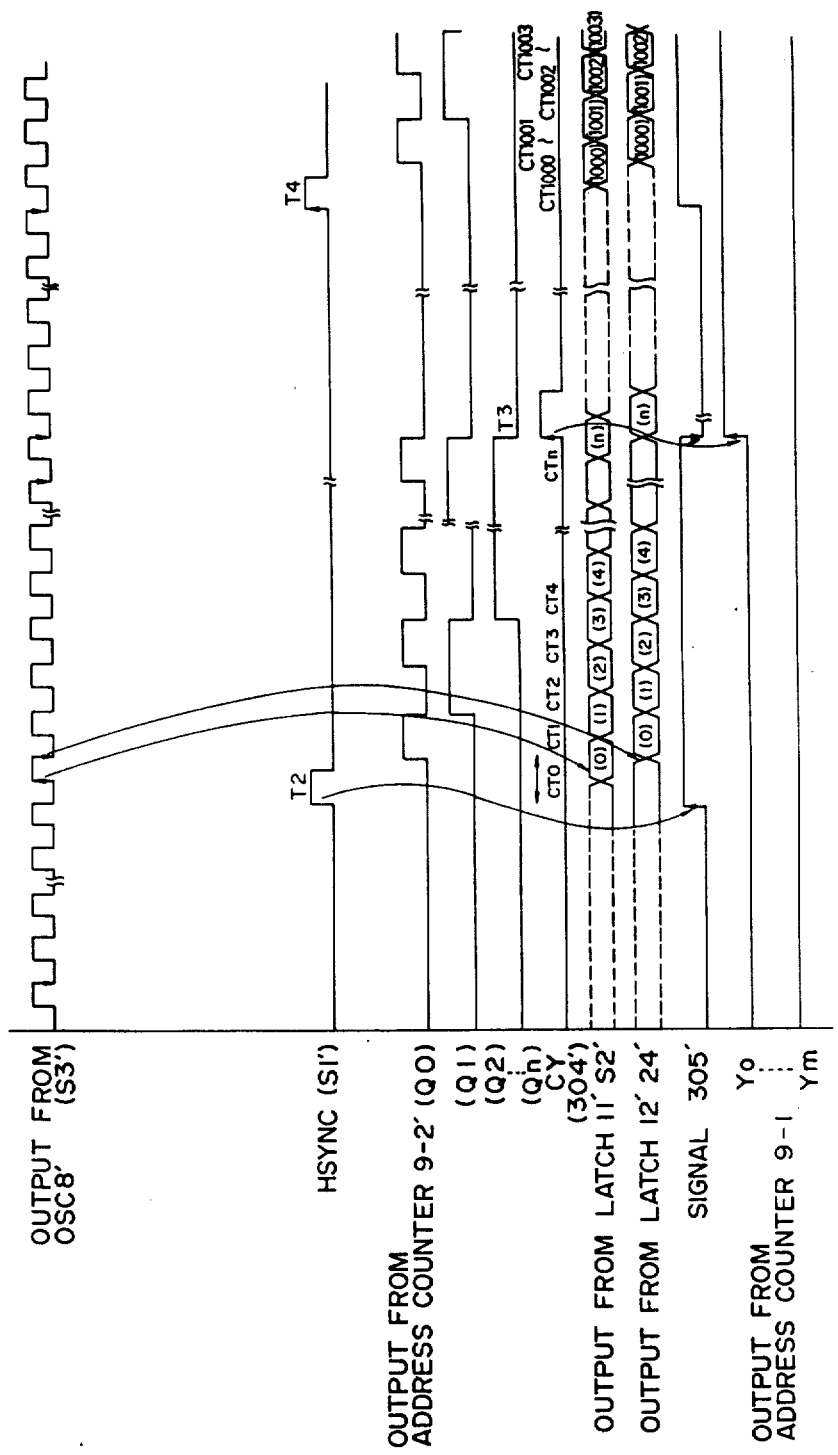
FIG. 8 is a timing chart showing various signals of the circuit shown in FIG. 7.

FIG. 7 shows, in more detail, the relation of the oscillator 6', counter 4', horizontal synchronization signal generator 7', address counter 9' and image memory 10', and FIGS. 8 and 9 are corresponding timing charts. In a state where the sheet size detector 3 supplies a currently selected sheet size to the counter 4', if the photodetector 5 detects the laser beam 23, the detection signal S7 is supplied as a load pulse to the counter 4' whereby a number corresponding to the sheet size is preset in said counter 4'. In response a zero-detecting NOR gate 301' releases a low-level output signal 302' (timing T1 in FIG. 9), whereby the counter 4' is released from the reset state and starts a count-down operation at the end of the clock signal S4' (timing T2 in FIG. 9). After a counting operation corresponding to the sheet size, the output signal 302' of the zero-detecting circuit 301' is again shifted to a high level (timing T3 in FIG. 9) and is supplied to the horizontal synchronization signal generator 7' to generate a horizontal synchronization signal S1' of a determined pulse duration. In this embodiment, there is employed a simple one-shot circuit triggered by the start of an input signal.

On the other hand, in the control unit 100', image signals are stored in the image memory 10' by an unrepresented process and can be read by address signals released from the address counter 9'. The address counter 9' is composed of a flip-flop 303', a counter 9-2' for releasing addresses of a line, and a counter 9-1' for releasing scanning line addresses. In response to the horizontal synchronization signal S1', the output $\overline{Q}$ 305 of the flip-flop 303' is shifted to the high level state (timing T2 in FIG. 9) whereby the counter 9-2' starts a counting operation from zero, thus counting the ends of the pixel clock signals S3' and designating the address of the image memory 10 in cooperation with the counter 9-1'. On the other hand, said counter 9-1' performs a stepwise increment in response to each carry signal 304' released from the counter 9-2' (timing T3 in FIG. 4) and releases output signals Y0 - Ym indicating the addresses of the scanning line.

CT0 - CTn in FIG. 8 indicate the output of the address counter 9', wherein CT0, CT1, . . . , CTn respectively indicate the timings of reading the addresses 0, 1, . . . , n of the image memory 10. The latch 11' performs latching operation at the start of the pixel clock signal S3' to release an output signal S2' as shown in FIG. 8, wherein (n) indicates the data of an address n in the memory. The signal S2' is supplied to the latch 12' which performs latching operation at the end of the pixel clock signal S3' in consideration of a delay in timing. FIG. 8 also shows the timing of the signal 24' from the latch 12'.

The counter 9-2', which corresponds to the number of data in a line, releases a carry signal 304' (timing T3 in FIG. 8) after beam scanning of a line. The carry signal 304' is supplied, through an inverter 306', to the preset terminal of the flip-flop 303' to shift the output $\overline{Q}$ thereof to the low level state (timing T3 in FIG. 8), whereby the counter 9-2 is cleared and remains zero until the horizontal synchronization signal S1' is entered again. The counter 9-1' performs a stepwise increment by the carry signal 304' to release the addresses of a next scanning line through the lines Y0 - Ym. For example, if a line contains 4096 pixels at maximum, the counter 9-2' releases outputs Q0–Q11 assuming values from 0 to FFF in hexadecimal number (0–4095 in decimal number), while the outputs Y0 - Ym of the counter 9-1' represent fourth and upper digits in hexadecimal number, or 13th and upper bits of the address of the image memory 10'.

After the scanning of a line, when the beam is detected again by the photodetector 5 at the start of scanning of a succeeding line, data corresponding to the sheet size, obtained from the sheet size detector 3 are loaded in the counter 4' (timing T4 in FIG. 8), and a procedure similar to the foregoing is executed. This procedure is different from the foregoing in that the output of the address counter 9' starts, for example, from an address 1000, in hexadecimal number, and the content of the image memory 10' is released from the address 1000, in the order of CT1000, CT1001, . . . as shown in FIG. 8, since the output Y0 of the counter 9-1' is in a state "1".

In the foregoing description, the counter 4' need not be composed of a down-counter but may be composed of an up-counter or a combination of an upcounter and a comparator. Also the image memory 10' and the address counter 9' in the control unit 1' are shown simply for the explanation of the interface and can be composed of any other component capable of releasing digital pixel signals in synchronization with horizontal synchronization signals and pixel clock signals, such as a television camera or a CCD sensor. Also, in the foregoing explanation it is assumed that the latch 11 performs a latching operation at the start of the pixel clock signal S3' while the latch 12' performs a latching operation at the end of said pixel clock signal, but both latches 11, 12 may perform a latching operation at the start or end of the pixel clock signal S3'.

Also in the foregoing description, a second clock generator 8' is provided in the control unit independently from the clock signal of the printer unit, but it is also possible to adopt a high clock frequency in the printer unit and to utilize a frequency obtained by dividing said high frequency, in place for said second clock generator. A change in clock frequency, for example for changing the image density, is attained in this case by a change in the ratio of said frequency division.

In the above-explained structures, the timing of synchronization signal is not affected at all by a change in the frequency of pixel clock signals for the purpose of a change in the image signal density of an enlargement or reduction of the image.

Though the foregoing embodiments are limited to recording apparatus in which image signals are supplied from the control unit to the printer unit, the present invention is not limited to such embodiments but is applicable also to a recording apparatus in which code signals are sent from the control unit to the printer unit. In such case, in response to a received code signal, the printer unit makes an access to a character generator to form a determined pattern such as a character or a graphic pattern.

Also, in the foregoing embodiments, the control unit 100 or 100' may be a reader which generates image signals by reading an original documents, places on a support table, with an image sensor such as CCD, or a host computer in which pixel data or code signals, collectively called recording data, to be supplied to the printer unit, are stored in a memory medium such as a magnetic tape. Also, the control unit 100 or 100' can be an electronic file.

Also, in the foregoing embodiments, the printer unit may also be composed, instead of a laser beam printer, of another printer such as an ink jet printer, a thermal printer or a wire dot printer.

Furthermore, the present invention is not limited to the foregoing embodiments but is subject to various modifications within the scope and spirit of the appended claims.

What I claim is:

1. A recording apparatus comprising:
   a recording unit for recording an image on the basis of recording data; and
   a control unit for sending said recording data to said recording unit;
   wherein said control unit comprises output means for outputting a first clock signal for sending said recording data to said recording unit, said recording data being sent to said recording unit in synchronism with said first clock signal, said first clock signal generated by said output means being sent from said control unit to said recording unit, and
   wherein said recording unit includes first latch means for latching said recording data sent from said control unit, said first latch means latching said recording data in synchronism with said clock signal sent from said control unit.

2. A recording apparatus according to claim 1, wherein said recording unit comprises clock signal generating means for generating said first clock signal, said first clock signal generated by said clock signal generating means being sent to said control unit.

3. A recording apparatus according to claim 2, wherein said recording unit comprises means for generating a readout start signal for said recording data, and said control unit is adapted to send said recording data to said recording unit in response to the generation of said readout start signal.

4. A recording apparatus according to claim 3, wherein said readout start signal generating means generates said readout start signal by counting a determined number of said first clock signal.

5. A recording apparatus according to claim 4, wherein said recording unit comprises means for forming an image by beam scanning; means for modulating said beam according to said recording data; and means for detecting the scanning position of said beam; wherein said readout start signal generating means effects said clock signal counting operation on the bases of a detection output signal of said scanning position detecting means.

6. A recording apparatus according to claim 1, wherein said recording unit comprises means for generating a readout start signal for said recording data, and said control unit is adapted to send said recording data to said recording unit in response to the generation of said readout start signal.

7. A recording apparatus according to claim 6, wherein said recording unit comprises generating means for generating a second clock signal different from said clock signal, and said readout start signal generating means generates said readout start signal by counting a determined number of said second clock signal.

8. A recording apparatus according to claim 7, wherein said recording unit comprises means for forming an image by beam scanning; means for modulating said beam on the basis of said recording data; and means for detecting the scanning position of said beam; and said readout start signal generating means effects the counting operation of said second clock signal on the bases of a detection output signal of said scanning position detecting means.

9. An apparatus according to claim 1, wherein said recording data is pixel data, and said control unit comprises memory means for storing the pixel data and second latch means for latching the pixel data outputted from said memory means, and said control unit sends the pixel data through said second latch means to said recording unit.

10. An apparatus according to claim 9, wherein said memory means outputs the pixel data in synchronism with said first clock signal and said second latch means latches said pixel data outputted from said memory means in synchronism with said first clock signal and sends the pixel data outputted from said memory means.

11. A recording apparatus comprising:
    a recording unit for recording an image on the basis of recording data; and
    a control unit for sending said recording data to said recording unit;
    wherein said control unit comprises first means for generating a first clock signal for sending said record recording data to said recording unit, said recording data being sent to said recording unit in synchronism with said first clock signal, said first clock signal generated by said first means being sent from said control unit to said recording unit,
    wherein said recording unit comprises second means for generating a second clock signal and means for generating a readout start signal for said recording data by counting a predetermined number of said clock signal, and
    wherein said control unit is adapted to send said recording data to said recording unit on the basis of the generation of said readout start signal.

12. A recording apparatus according to claim 11, wherein said recording unit comprises means for forming an image by beam scanning; means for modulating said beam according to said recording data; and means for detecting the scanning position of said beam; wherein said readout start signal generating means effects the counting operation of said second clock signals on the basis to a detection output signal of said scanning position detecting means.

13. A recording apparatus according to claim 11, further comprising means for detecting the size of a recording sheet to be employed in said recording unit, wherein said recording unit is adapted to change the number of said second clock signals to be counted according to the detected sheet size.

14. A recording apparatus according to claim 11, wherein the frequency of the first clock signal generated by said first means are changed on the basis of the image density.

15. An apparatus according to claim 11, wherein said recording unit includes first latch means for latching the recording data sent from said control unit and said first latch means latches said recording data in synchronism with said first clock signal sent from said control unit.

16. An apparatus according to claim 15, wherein said recording data is pixel data, and said control unit comprises memory means for storing the pixel data and second latch means for latching the pixel data outputted from said memory means, and said control unit sends the pixel data through said second latch means to said recording unit.

17. An apparatus according to claim 16, wherein said memory means outputs the pixel data in synchronism with said first clock signal and said second latch means latches the pixel data outputted from said memory means and sends the pixel data to said recording means.

* * * * *

UNITED STATES PATENT AND TRADEMARK OFFICE
CERTIFICATE OF CORRECTION

PATENT NO. : 4,695,849

DATED : September 22, 1987

INVENTOR(S) : KATSUHITO DEI

It is certified that error appears in the above-identified patent and that said Letters Patent is hereby corrected as shown below:

COLUMN 1

Line 21, "perior" should read --period--.
    Line 26, "to" should be deleted.
    Line 30, "to" should be deleted.
    Line 58, "to" should be deleted.

COLUMN 2

Line 61, "later" should read --later,--.

COLUMN 5

Line 39, "response" should read --response,--.

COLUMN 6

Line 48, "upcounter" should read --up-counter--.
    Line 51, "interface" should read --interface,--.

UNITED STATES PATENT AND TRADEMARK OFFICE
CERTIFICATE OF CORRECTION

PATENT NO. : 4,695,849

DATED : September 22, 1987

INVENTOR(S) : KATSUHITO DEI

It is certified that error appears in the above-identified patent and that said Letters Patent is hereby corrected as shown below:

COLUMN 7

Line 20, "documents, places" should read --document, placed--.
Line 51, "said clock" should read --said first clock--.
Line 68, "signal." should read --signals.--.

COLUMN 8

Line 7, "bases" should read --basis--.
Line 19, "said clock signal" should read --said first clock signal--.
Line 30, "bases" should read --basis--.
Line 51, "re-" should be deleted.
Line 52, ""cord" should be deleted.

COLUMN 9  Line 4, "to" should read --of--.
Line 14, "are" should read --is--.

Signed and Sealed this

Fourteenth Day of June, 1988

Attest:

DONALD J. QUIGG

*Attesting Officer*   *Commissioner of Patents and Trademarks*